(12) United States Patent
Chan et al.

(10) Patent No.: US 7,292,282 B2
(45) Date of Patent: Nov. 6, 2007

(54) DIGITAL CAMERA EMPLOYING MULTIPLE LIGHT SHIELDING WALLS

(75) Inventors: Raymond Chan, Kowloon (CN); Nobuaki Higashi, Shibuya-ku (JP); Mikihiko Kato, Minato-ku (JP)

(73) Assignees: IDT Data System Limited, Hong Kong (CN); Fuji Film Axia Co., Ltd., Tokyo (JP); Fujifilm Corporation, Tokyo (JP)

( * ) Notice: Subject to any disclaimer, the term of this patent is extended or adjusted under 35 U.S.C. 154(b) by 820 days.

(21) Appl. No.: 10/384,794

(22) Filed: Mar. 11, 2003

(65) Prior Publication Data

US 2004/0001157 A1 Jan. 1, 2004

(30) Foreign Application Priority Data

Mar. 12, 2002 (JP) .............................. 2002-066956

(51) Int. Cl.
*G02B 13/16* (2006.01)
*H04N 5/225* (2006.01)

(52) U.S. Cl. ..................... 348/374; 348/335; 348/341

(58) Field of Classification Search ................ 348/374, 348/335; 396/373
See application file for complete search history.

(56) References Cited

U.S. PATENT DOCUMENTS 6,643,459 B2 * 11/2003 Ota .............................. 396/84
6,721,014 B1 * 4/2004 Ariga ........................... 348/374
6,856,345 B1 * 2/2005 Yamamoto et al. .......... 348/207.2
2002/0154243 A1 * 10/2002 Fife et al. .................... 348/372

FOREIGN PATENT DOCUMENTS

| JP | 7-120654 A | 5/1995 |
|---|---|---|
| JP | 10-248029 | 9/1998 |
| JP | 11-282073 A | 10/1999 |

OTHER PUBLICATIONS

Corrected drawings for Fife et al. US 2002/0154243 A1 "Compact Digital Camera System", U.S. Appl. No. 10/024, 913.*

* cited by examiner

*Primary Examiner*—Ngoc-Yen Vu
*Assistant Examiner*—Adam L Henderson
(74) *Attorney, Agent, or Firm*—Sughrue Mion Pllc

(57) ABSTRACT

A main frame of a camera body has a CMOS image sensor and an eyepiece of an optical finder, and the lens unit popped up from the camera body has a taking lens and an objective lens of the optical finder. Light shielding walls are formed on the main frame, and light shielding walls are formed on the lens unit. When the lens unit is popped up, the light shielding walls and the light shielding walls slightly overlap each other, thus preventing a light from the optical finder from entering the CMOS image sensor. Thus, the digital camera has a lens unit popped up from a camera body and prevents unnecessary lights other than a subject light from entering an image pickup device.

6 Claims, 14 Drawing Sheets

DIGITAL CAMERA EMPLOYING MULTIPLE LIGHT SHIELDING WALLS

BACKGROUND OF THE INVENTION

1. Field of the Invention

The present invention relates to a digital camera, and more particularly to a light shielding measure for a card type digital camera.

2. Description of the Related Art

Japanese Patent Application Publication No. 10-248029 discloses a card type digital camera of a PC card size, which has a lens unit holding a taking lens. The lens unit is projectable from a camera body, and is popped up from the camera body in shooting to secure an optical path length between the taking lens and an image pickup device. When the camera is not used, the lens unit retracts in the camera body so that the camera is like a card, thus reducing the bulk of the camera to be housed in a pocket or the like.

However, the conventional card type digital camera has no light shielding measure between the popped up lens unit and the camera body, and unnecessary lights other than a subject light from the taking lens may enter the image pickup device.

Further, when an objective lens of an optical finder is also provided in the lens unit, a light that enters the optical finder may enter the image pickup device.

Another collapsible camera has been known that houses a lens barrel in a camera body, and extends the lens barrel from the camera body in shooting. Such a collapsible camera can easily secure light tightness by a relatively large overlap between a base of the lens barrel and the camera body when the lens barrel is extended. However, this arrangement is not applicable to a thin card type camera.

SUMMARY OF THE INVENTION

The present invention is achieved in view of the above, and has an object to provide a digital camera that has a lens unit popped up from a camera body and prevents unnecessary lights other than a subject light from entering an image pickup device.

In order to attain the above described object, the present invention is directed to a digital camera, comprising: a camera body which has an image pickup device and an eyepiece of an optical finder; a lens unit which holds a taking lens and an objective lens of the optical finder; and a popping up mechanism which projects and retracts the lens unit from and in the camera body, wherein: the camera body has a first light shielding wall which divides the image pickup device from the eyepiece; the lens unit has a second light shielding wall which divides the taking lens from the optical finder; and when the lens unit is popped up, the first light shielding wall and the second light shielding wall slightly overlap each other, or an end surface of the first light shielding wall and an end surface of the second light shielding wall are flush with each other, thereby preventing a light that enters the optical finder from entering the image pickup device.

According to the present invention, if the lens unit popped up from the camera body has the taking lens and the objective lens of the optical finder, the light from the optical finder enters the image pickup device. This prevents the light from the optical finder from entering the image pickup device by the first light shielding wall of the camera body, and the second light shielding wall of the lens unit. The first light shielding wall and the second light shielding wall slightly overlap each other, or the end surface of the first light shielding wall and the end surface of the second light shielding wall are flush with each other, thus allowing even a thin camera body to house the lens unit such that front surfaces of the camera body and the lens unit are flush with each other.

In order to attain the above described object, the present invention is also directed to a digital camera, comprising: a camera body which has an image pickup device; a lens unit which holds a taking lens; and a popping up mechanism which projects and retracts the lens unit from and in the camera body, wherein the camera body has a light shielding member which has an opening opposing the image pickup device and abuts against an inner peripheral surface of the lens unit.

According to the present invention, even if an external light enters the camera body from between the popped up lens unit and the camera body, the light shielding member that abuts against the inner peripheral surface of the lens unit blocks the light.

In order to attain the above described object, the present invention is also directed to a digital camera, comprising: a camera body which has an image pickup device; a lens unit which holds a taking lens; and a popping up mechanism which projects and retracts the lens unit from and in the camera body, wherein the camera body has a light shielding member which has a first opening for the lens unit to project and abuts against an outer peripheral surface of the lens unit.

According to the present invention, the light shielding member that abuts against the outer peripheral surface of the lens unit provides light shielding between the lens unit and the camera body to prevent an external light from entering the camera body from between the lens unit and the camera body. The light shielding member is dustproof to protect the camera body from dust.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
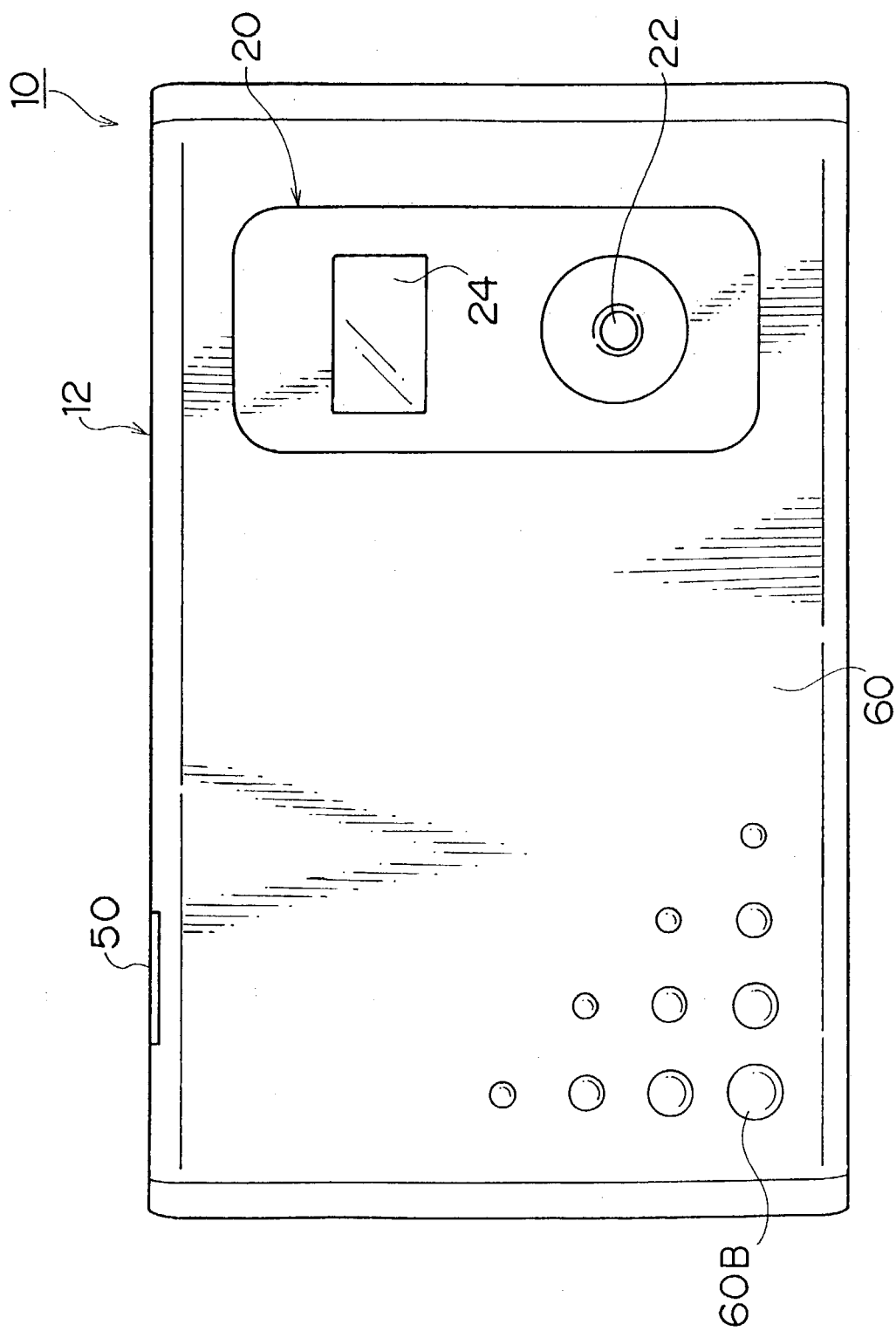
FIG. 1 is a front view of an appearance of a digital camera according to the invention.

A preferred embodiment of a digital camera according to the invention will be described with reference to the accompanying drawings.

FIGS. 1 to 4 are front, back, right side, left side views of an appearance of a digital camera according to an embodiment of the invention.

The digital camera 10 in the drawings is of a card type with a thickness of 6 mm, and includes a camera body 12 and a lens unit 20.

As shown in FIG. 1, at a front of the camera body 12, there is arranged the lens unit 20, which is projectable and retractable, and holds a taking lens 22 and an objective lens 24 of an optical finder (an inverted Galilean finder).

Figure 2:
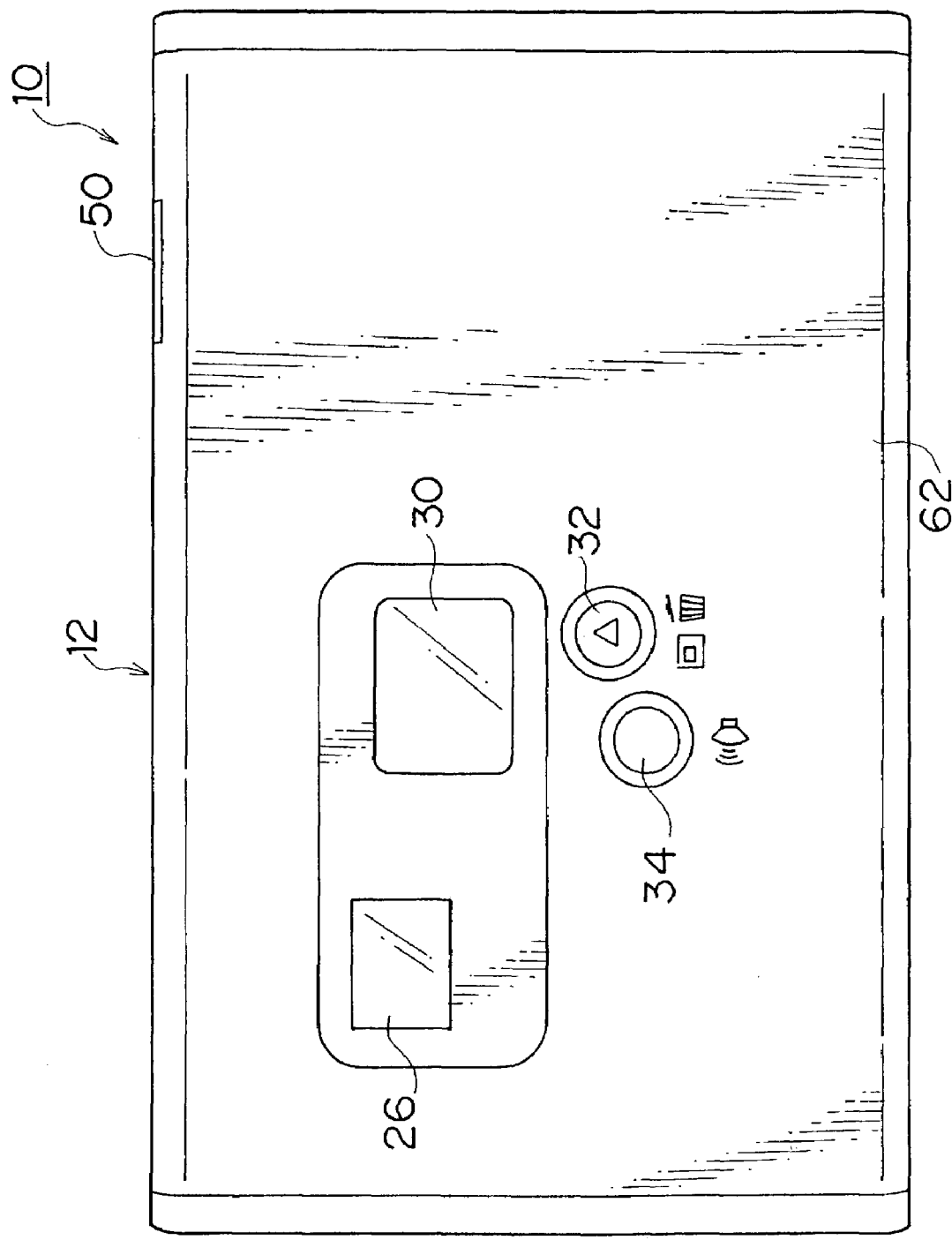
FIG. 2 is a back view of the appearance of the digital camera according to the invention.

As shown in FIG. 2, at a back of the camera body 12, there are arranged an eyepiece 26 of the optical finder, a liquid crystal display 30, an image quality switching/image erasing button 32, and a beep on/off button 34. The liquid crystal display 30 displays the number of pictures taken, image quality (640×480 pixels/320×240 pixels), battery remaining, beep on/off, or the like.

Figure 3:
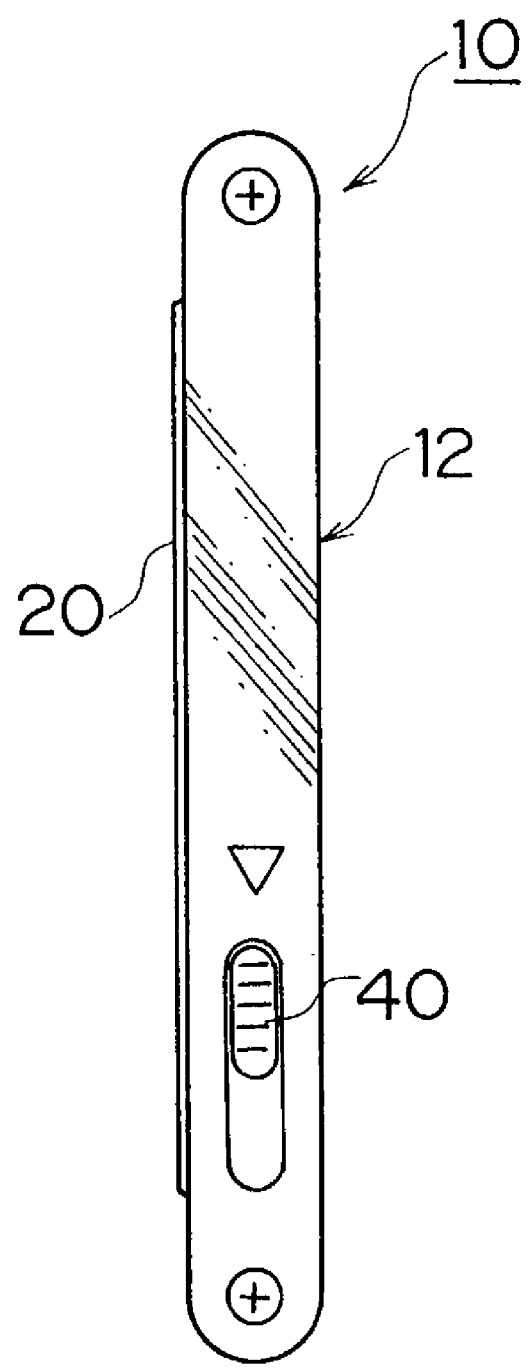
FIG. 3 is a right side view of the appearance of the digital camera according to the invention.
Figure 4:
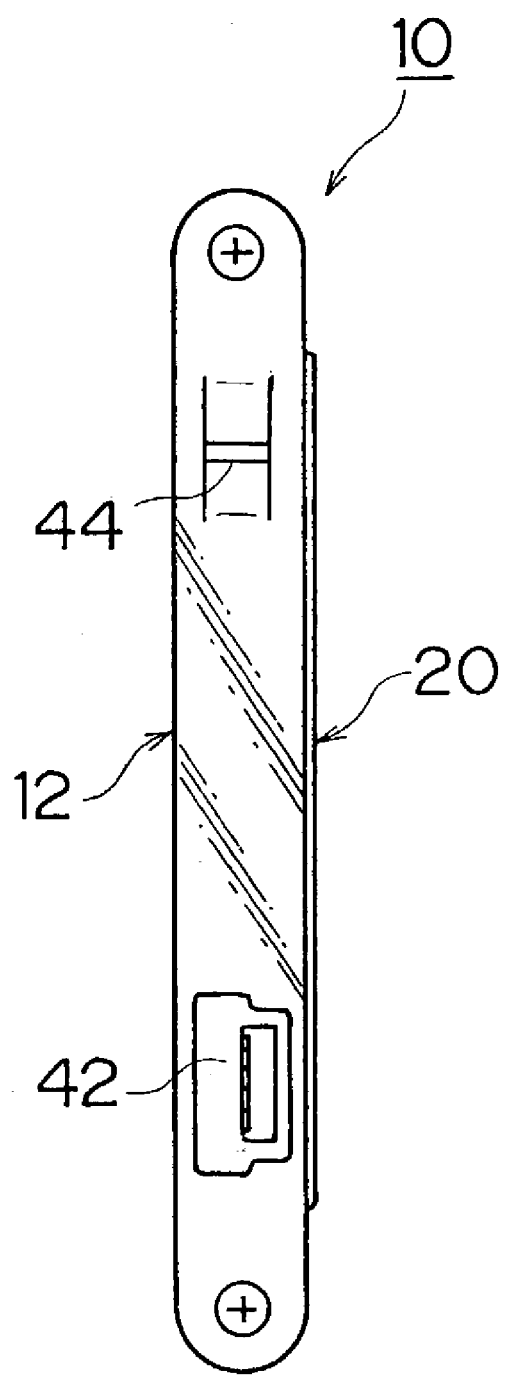
FIG. 4 is a left side view of the appearance of the digital camera according to the invention.

As shown in FIG. 3, a lens popping up switch 40 for popping up the lens unit 20 is arranged at a right side (a side opposite a grip) of the camera body 12. As shown in FIG. 4, a digital (USB) terminal 42 and a strap attaching portion 44 are arranged at a left side (a grip side) of the camera body 12. Further, as shown in FIGS. 1 and 2, a shutter release button 50 is arranged at the top of the camera body 12.

Figure 5:
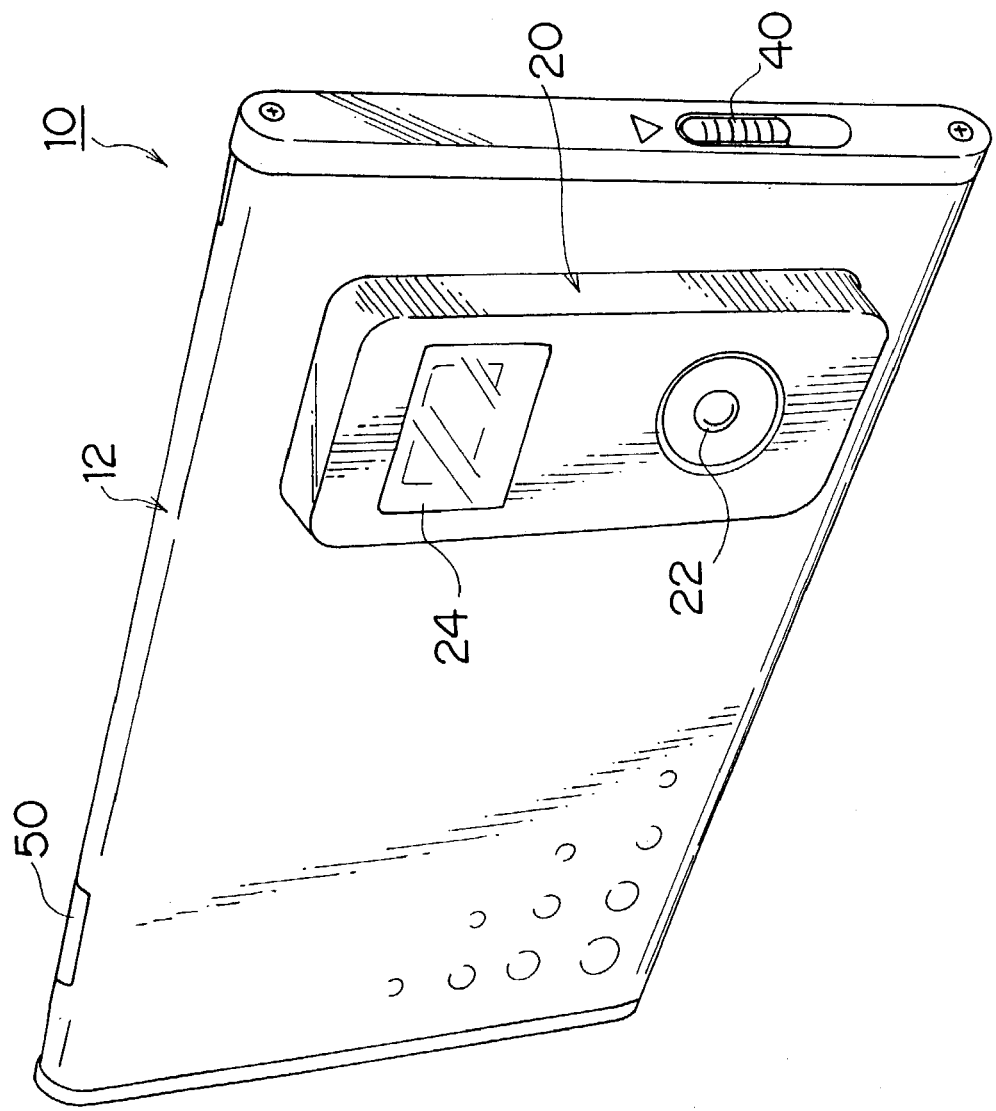
FIG. 5 is a perspective view of the digital camera with a lens unit popped up, seen from the front.

FIG. 5 is a perspective view of the digital camera 10 with the lens unit 20 popped up, seen from the front.

An exterior body of the digital camera 10 includes a front cover 60 and a rear cover 62 made of metal (e.g., aluminum).

Figure 6:
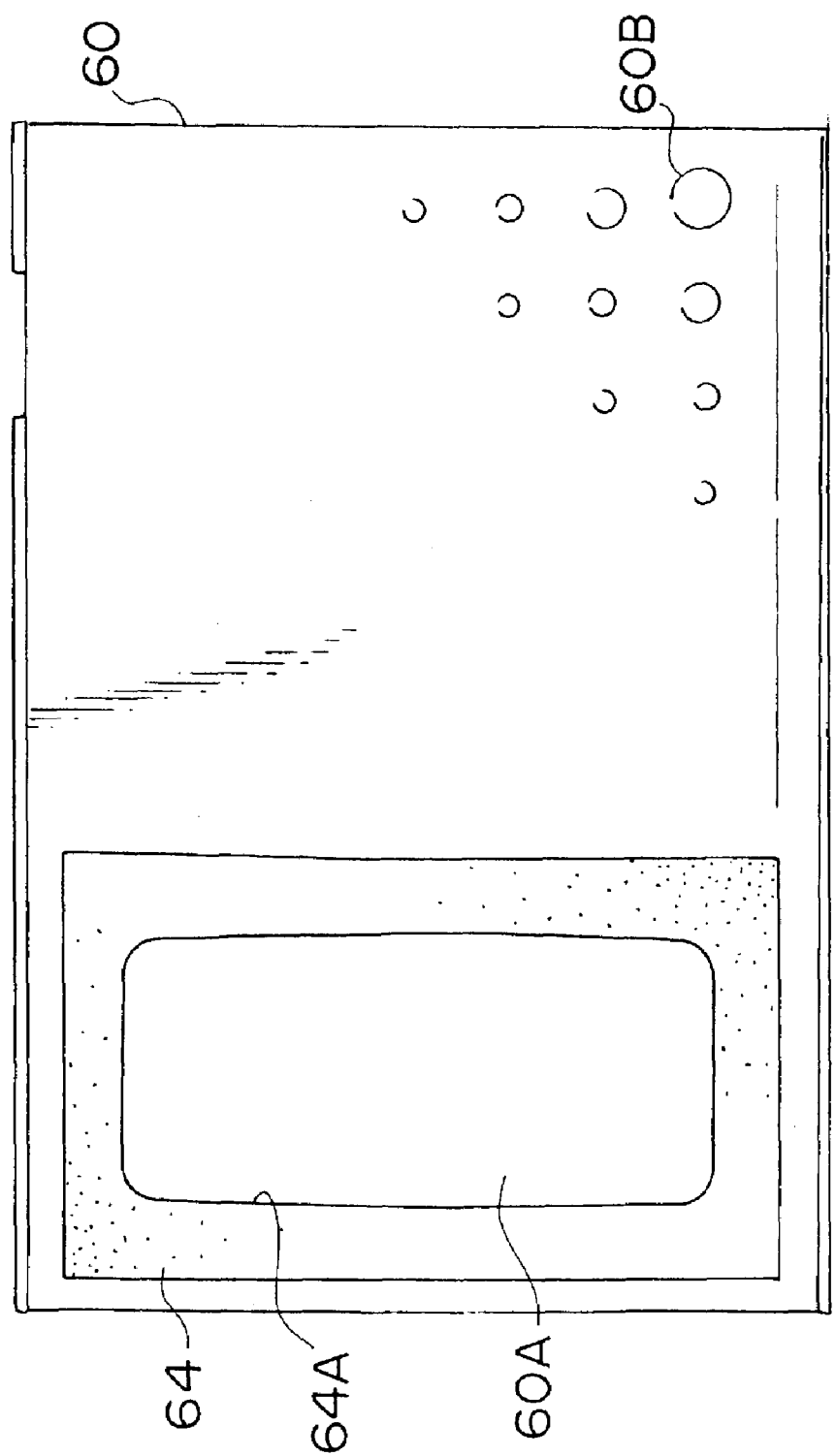
FIG. 6 is a plan view of an inside of a front cover of the digital camera.

FIG. 6 is a plan view of an inside of the front cover 60. As shown in the drawing, the front cover 60 has an opening 60A, through which the lens unit 20 projects and retracts, and a light shielding rubber 64 is attached around the opening 60A. An opening 64A of the light shielding rubber 64 is slightly smaller than the opening 60A of the front cover 60, and always abuts against an outer peripheral surface of the lens unit 20 with elasticity as described below. In FIGS. 1 and 6, reference numeral 60B designates an uneven surface that supports fingers in gripping.

Now, an inner structure of the digital camera 10 will be described.

Figure 7:
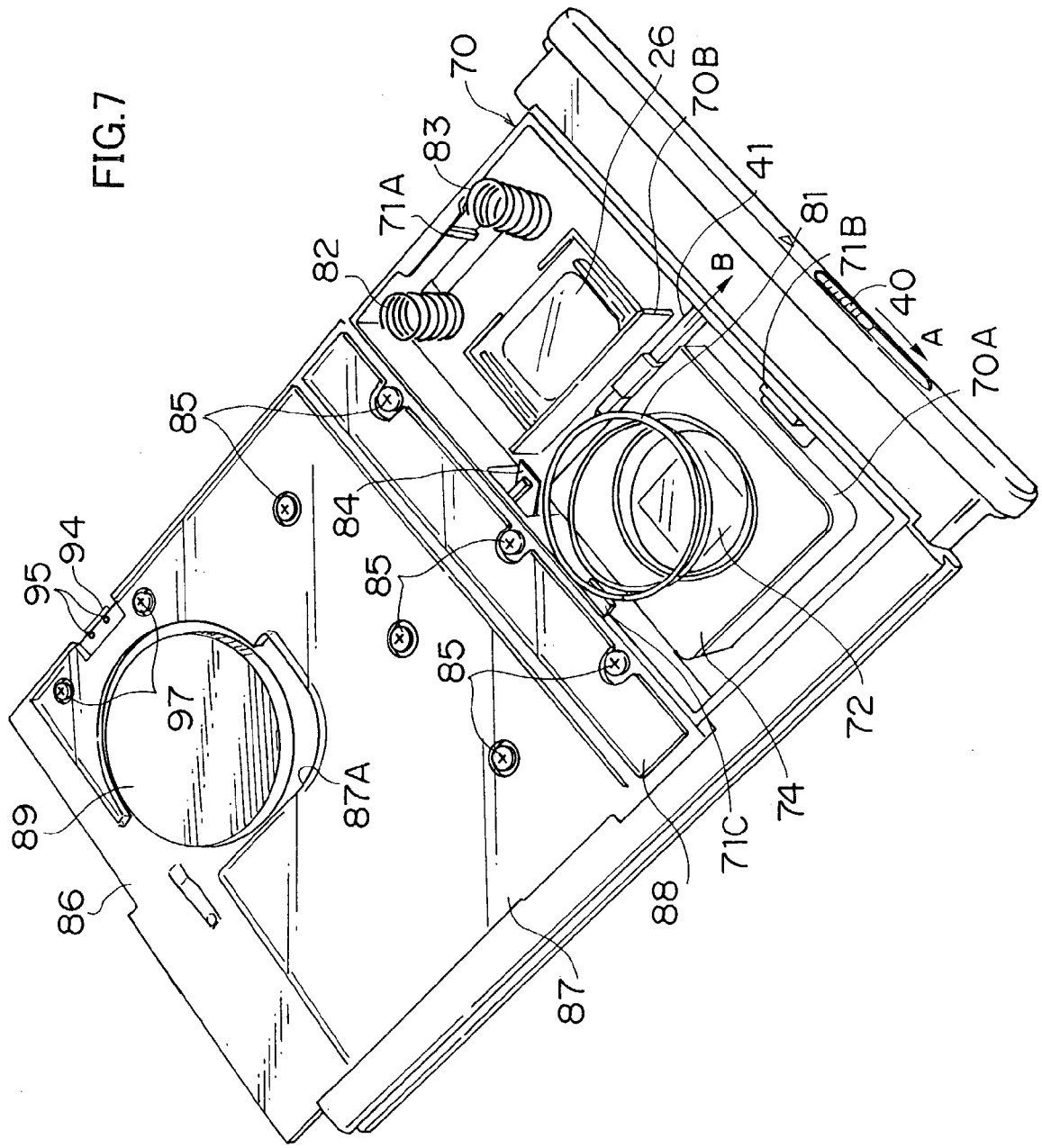
FIG. 7 is a perspective view of a camera body with the front cover and the lens unit removed from the digital camera.
Figure 8:
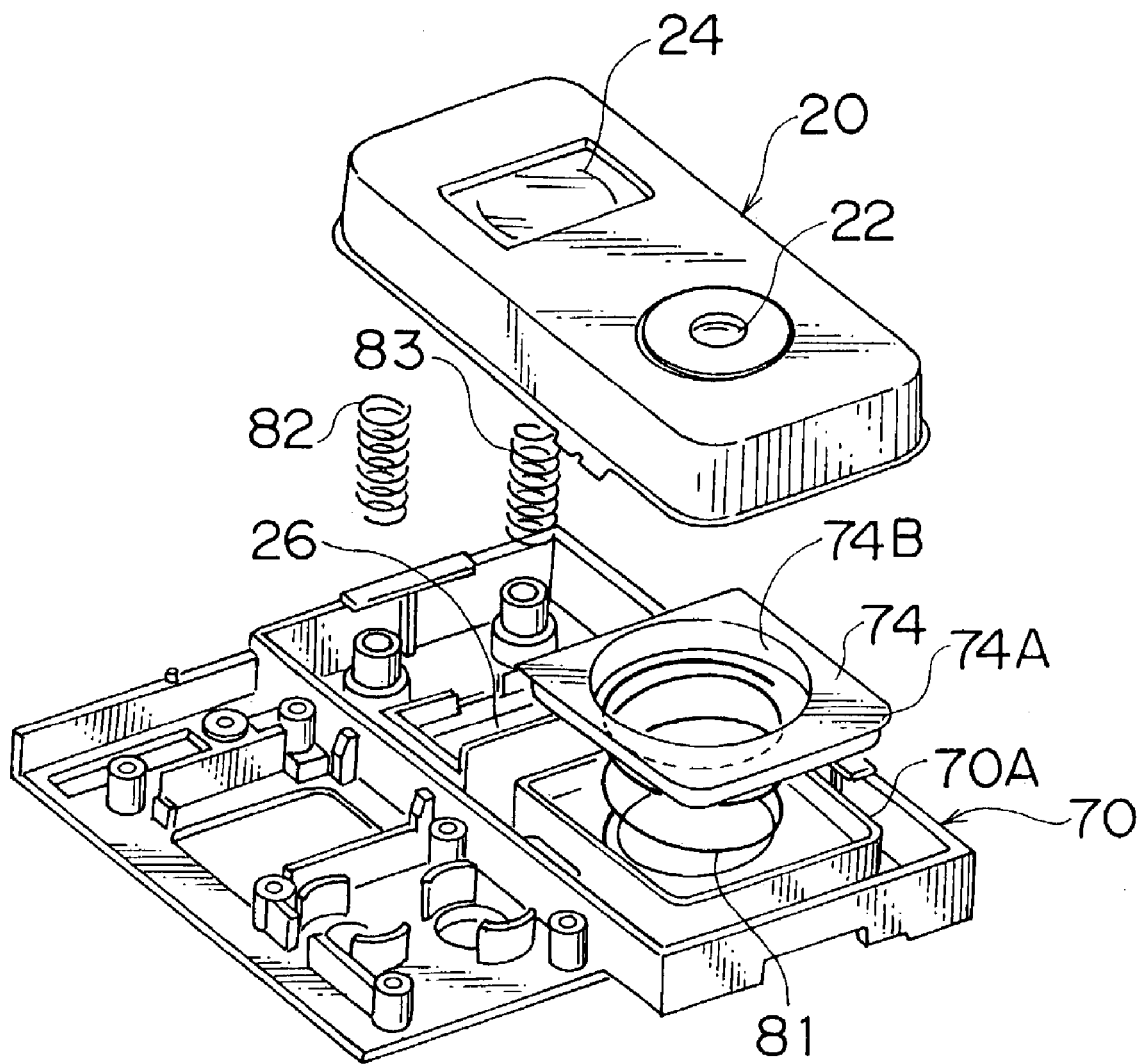
FIG. 8 is an exploded perspective view of essential portions of the lens unit and the camera body.
Figure 9:
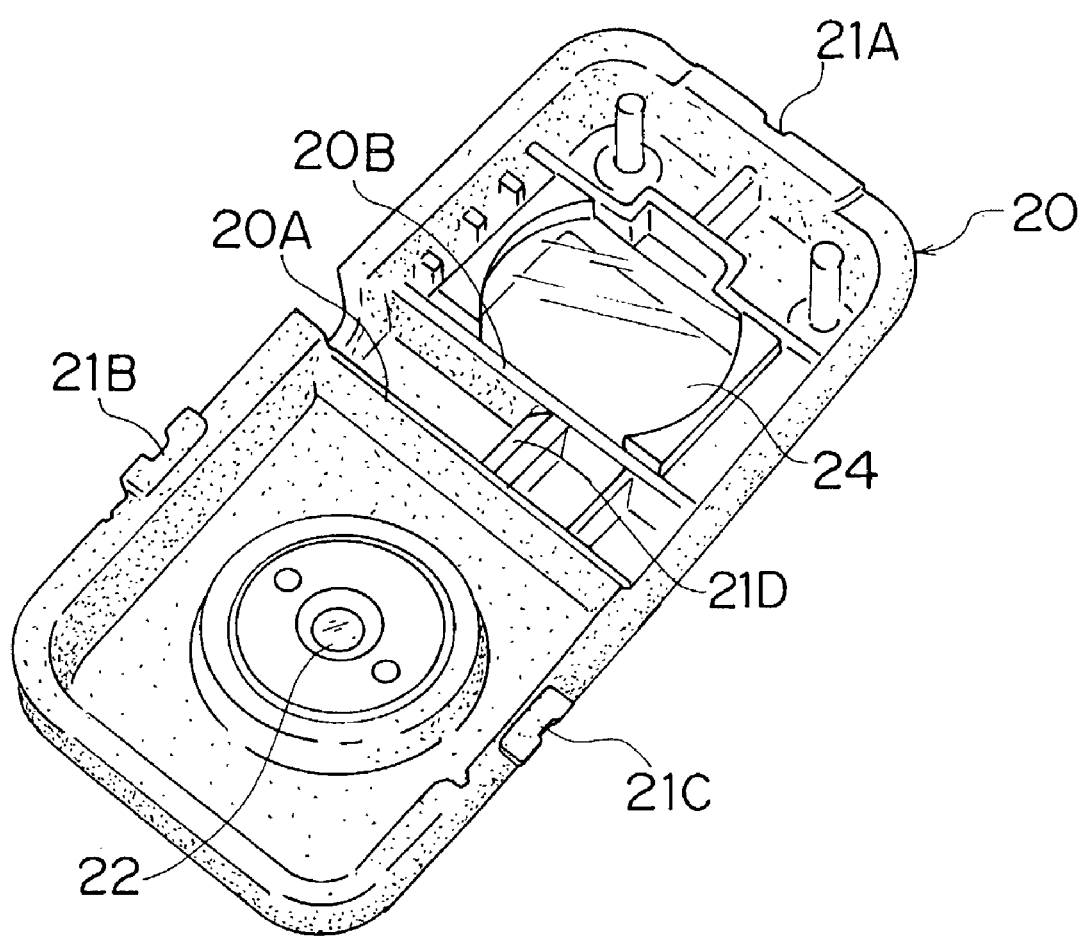
FIG. 9 is a perspective view of the lens unit, seen from the inside.

FIG. 7 is a perspective view of the camera body with the front cover 60 and the lens unit 20 removed from the digital camera 10, FIG. 8 is an exploded perspective view of essential portions of the lens unit 20 and the camera body to which the projectable lens unit 20 is mounted, and FIG. 9 is a perspective view of the lens unit 20, seen from the inside.

As shown in FIGS. 7 and 8, an image pickup device (e.g., a CMOS image sensor) 72 and the eyepiece 26 of the optical finder are mounted to a main frame 70 made of plastic. A light shielding wall 70A that surrounds a front periphery of the CMOS image sensor 72 is formed on the main frame 70, and an inner rubber 74 made of a light shielding member is loaded into the light shielding wall 70A as shown in FIG. 8.

As shown in FIG. 8, a top of the inner rubber 74 has a flange 74A, and a middle of the inner rubber 74 has an opening 74B opposing the CMOS image sensor 72. The flange 74A is slightly larger than an outer periphery of the light shielding wall 70A, and always abuts against the inner peripheral surface of the lens unit 20 with elasticity.

As shown in FIG. 7, a light shielding wall 70B that divides the CMOS image sensor 72 from the eyepiece 26 is formed integrally with the main frame 70.

On the other hand, as shown in FIG. 9, light shielding walls 20A, 20B made of plastic that divide the taking lens 22 from the objective lens 24 of the optical finder are formed integrally with the inside of the lens unit 20. The light shielding walls 20A, 20B are placed between the light shielding walls 70A, 70B of the main frame 70 of the camera body so that these light shielding walls prevent a light from the optical finder from entering the CMOS image sensor 72.

Next, a popping up mechanism for popping up the lens unit 20 will be described.

As shown in FIGS. 7 and 8, three coil springs 81, 82, 83 are placed between the lens unit 20 and the main frame 70 of the camera body. The coil spring 81 is placed inside the opening 74B of the inner rubber 74 so as to surround an optical path from the taking lens 22 to the CMOS image sensor 72, and the coil springs 82, 83 are placed at corners of the lens unit 20 opposite the coil spring 81.

Three coil springs for popping up are provided because three is the minimum number of coil springs required to exert a uniform energizing force on the lens unit 20 (to achieve a balance among top, bottom, right and left energizing forces exerted on the lens unit 20). One coil spring 81 on the taking lens 22 side and two coil springs 82, 83 on the optical finder side are provided to efficiently arrange the three coil springs in view of the circular taking lens 22, and the rectangular objective lens 24 and eyepiece 26 of the optical finder.

In the main frame 70 of the camera body, a leaf switch 84 as a power switch is placed that is turned on/off by a lower end surface of the lens unit 20. The leaf switch 84 acts to force the lens unit 20 up. Thus, between the two coil springs 82, 83, the coil spring 82 closer to the leaf switch 84 is less strong than the coil spring 83 by an energizing force of the leaf switch 84.

Three guides 21A, 21B, 21C are formed on the lens unit 20, and three guides 71A, 71B, 71C that also serve as stoppers are formed on the main frame 70 correspondingly to the guides 21A, 21B, 21C. These guides lead the lens unit 20 movably in a direction projecting from the camera body.

Next, a lock mechanism will be described that locks the lens unit 20 forced in the projecting direction by the three coil springs 81, 82, 83, within the camera body.

In FIG. 7, sliding the lens popping up switch 40 in an arrow A direction allows a locking rod 41 with an inclined face at the tip thereof to move in an arrow B direction.

Figure 10:
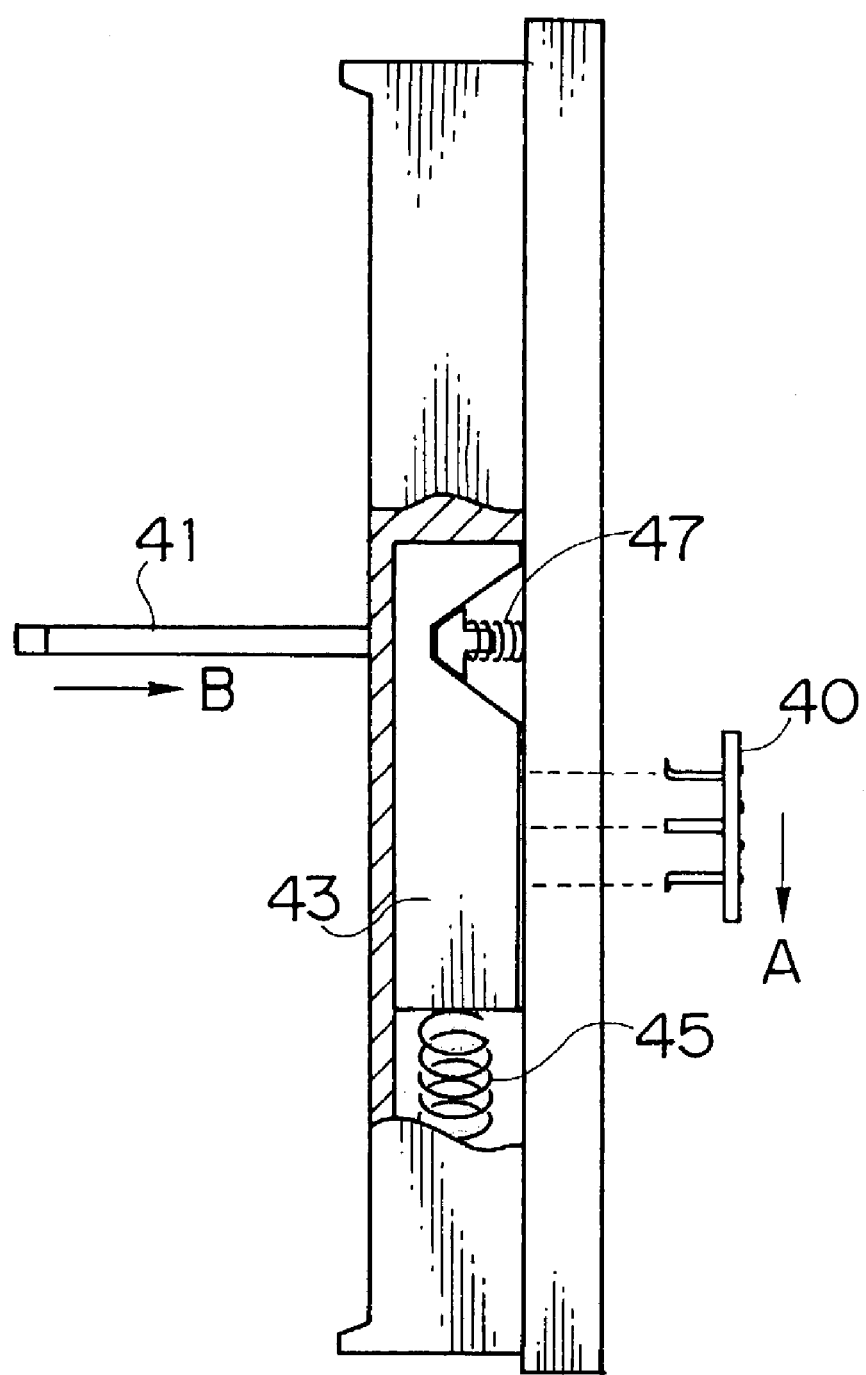
FIG. 10 illustrates, partly in section, a lock mechanism of the lens unit.

Specifically, as shown in FIG. 10, a sliding member 43 to which the lens popping up switch 40 is fitted is provided on the side of the camera body to be vertically movable in FIG. 10. The sliding member 43 is forced up by a spring 45 provided at a lower end. The sliding member 43 has an inclined face, which engages an inclined face formed at a base of the locking rod 41. The locking rod 41 is provided on the side of the camera body to be laterally movable in FIG. 10, and forced to the left by a spring 47.

Thus, when the lens popping up switch 40 is slid in the arrow A direction in FIG. 10, the sliding member 43 also moves in the arrow A direction. When the sliding member 43 moves in the arrow A direction, the inclined face formed on the sliding member 43 causes the locking rod 41 to move in the arrow B direction against the energizing force of the spring 47. The lens popping up switch 40 (the sliding member 43) can return to a position shown in FIG. 10 by the spring 45 in non-operation.

On the other hand, as shown in FIG. 9, a hook 21D that engages the tip of the locking rod 41 is formed inside the lens unit 20. The hook 21D has an inclined and overhanging (not shown) surface that abuts against the tip of the locking rod 41 when the lens unit 20 is pressed down.

When the lock mechanism configured as described above is used to press down the lens unit 20 against the energizing forces of the coil springs 81, 82, 83, the locking rod 41 is moved (retracted) in the arrow B direction by the inclined surface of the hook 21D of the lens unit 20. When retracted beyond the inclined surface of the hook 21D, the locking rod 41 enters the overhanging hook 21D to engage the hook 21D. Thus, the lens unit 20 is locked within the camera body.

When the lens unit 20 is popped up, the lens popping up switch 40 is slid. Thus, the locking rod 41 is retracted, the lens unit 20 is disengaged from the hook 21D (the lock is released), and the lens unit 20 is popped up by the energizing forces of the coil springs 81, 82, 83 as shown in FIG. 5.

As shown in FIG. 7, the leaf switch 84 as the power switch that is turned on/off by the lower end surface of the lens unit 20 is placed near a lock position of the lens unit 20, so that pressing a top or a bottom end of the lens unit 20 housed in the camera body do not raise the bottom end surface of the lens unit 20 that presses the leaf switch 84, thereby preventing unnecessarily turning on the power.

As shown in FIG. 7, a circuit board 86 is mounted with six screws 85 to the main frame 70 of the camera body shown in FIG. 8.

To reinforce the circuit board 86, acrylic reinforcing plates 87, 88 are attached to a front of the circuit board 86. The reinforcing plate 87 has a notch 87A, where a beeper 89 is placed that makes a beep to indicate activation of the camera or the like.

Figure 11:
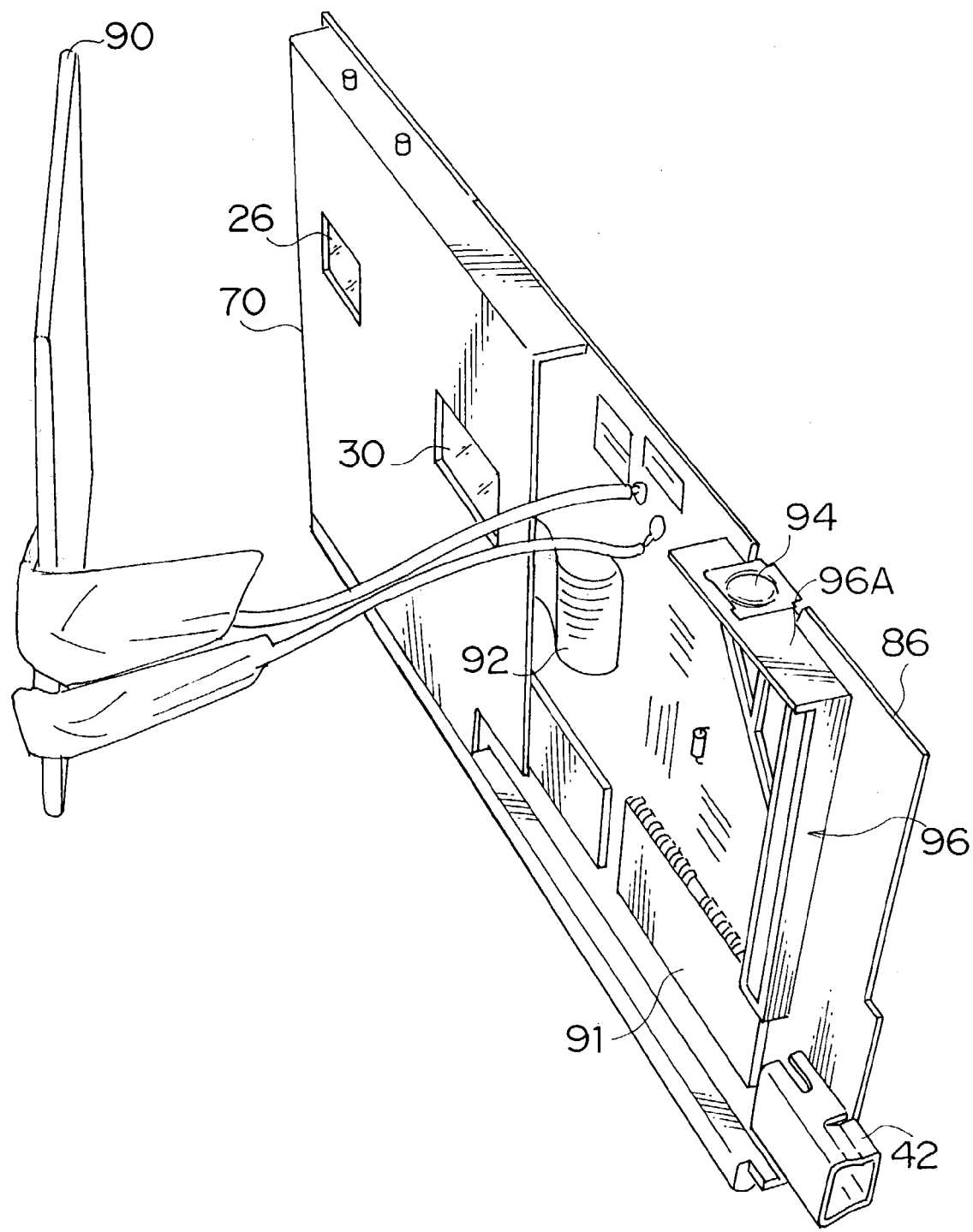
FIG. 11 is a perspective view of a main frame and a circuit board or the like in the camera body, seen from the back.

FIG. 11 is a perspective view of the main frame 70 and the circuit board 86 or the like in the camera body, seen from the back.

As shown in the drawing, the circuit board 86 includes the USB terminal 42, a sheet-like rechargeable battery 90, and a flash memory 91 that stores image data, an image signal processing IC (not shown), a CPU that controls the entire camera, or the like. The liquid crystal display 30 is connected to the circuit board 86 with a flexible wiring pattern 92.

The image data stored in the flash memory 91 by shooting with the digital camera 10 is transferred to an external device such as a personal computer connected via the USB terminal 42. The rechargeable battery 90 inside is automatically recharged during the image transfer caused by connecting the USB terminal 42.

Next, a shutter release button 50 will be described.

As shown in FIG. 5, the top of the camera body 12 has a key top of the shutter release button 50. As shown in FIG. 11, the circuit board 86 has a shutter switch 94 that is turned on/off by a pressing protrusion 50A (see FIGS. 12(A) and 2(B)) on a back of the key top.

Specifically, as shown in FIG. 11, a shutter support member 96 is mounted to the circuit board 86. As shown in FIG. 7, the shutter support member 96 is mounted to the circuit board 86 with two screws 97 and an adhesive.

As shown in FIG. 11, the shutter support member 96 is in the form of a substantially L-shaped bracket, and has a shutter support surface 96A for supporting the shutter switch 94. The shutter switch 94 is held on the shutter support surface 96A, and electrically connected to the circuit board 86 by solder 95 as shown in FIG. 7.

Figure 12A:
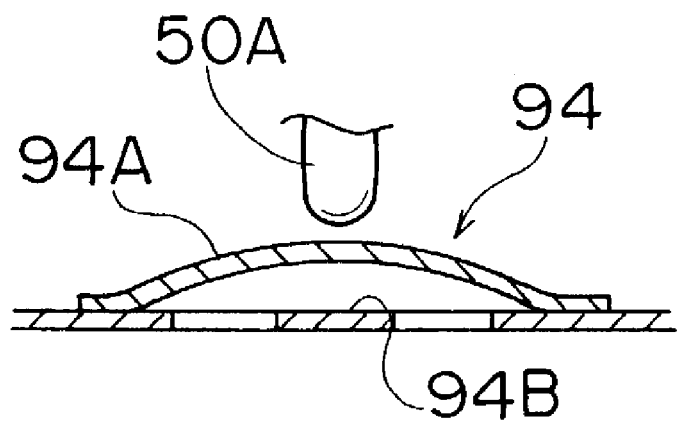
FIGS. 12(A) and 12(B) are sectional views showing a structure of a shutter switch.
Figure 12B:
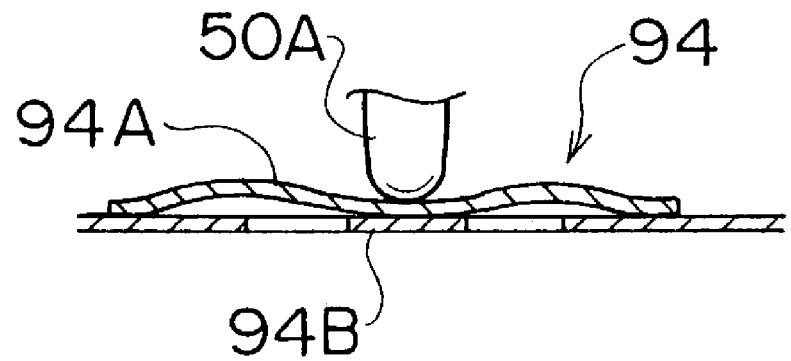

FIGS. 12(A) and 12(B) are sectional views of states of the shutter switch 94 before and while pressing down the shutter release button 50.

As shown in the drawings, the shutter switch 94 includes a dome-like metal Belleville spring 94A, and a fixed contact 94B. When the shutter release button 50 is pressed down from the state shown in FIG. 12(A) where the shutter release button 50 is not yet pressed down (the switch is off), the pressing protrusion 50A on the key top of the shutter release button 50 deforms the metal Belleville spring 94A to contact the fixed contact 94B as shown in FIG. 12(B), thus turning on the switch.

The shutter support member 96 can well receive a pressing force exerted on the shutter switch 94 when the shutter release button 50 is pressed down, so that the shutter switch 94 can bear repeated operation of the shutter release button 50.

The shutter support member 96 according to the embodiment is in the form of the substantially L-shaped bracket, and thus also serves as a reinforcing member that reinforces the circuit board 86 laterally and vertically.

The structure of the shutter switch 94 and the shape of the shutter support member 96 are not limited to those in the embodiment.

Next, a light shielding structure of the digital camera 10 will be described in detail with reference to FIGS. 13 and 14.

Figure 13:
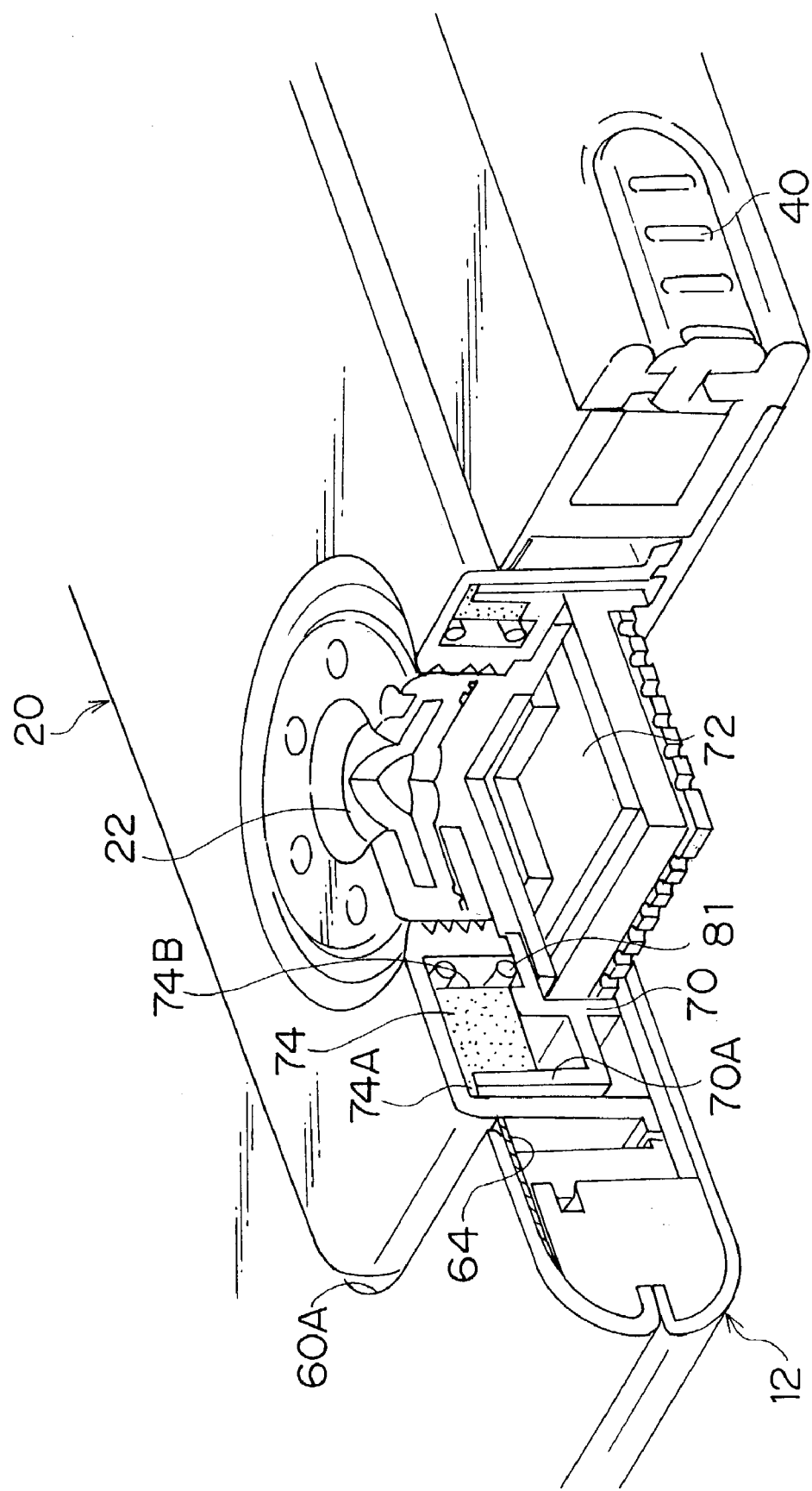
FIG. 13 is a perspective view, partly in section, of the lens unit and the camera body with the lens unit housed in the camera body.
Figure 14:
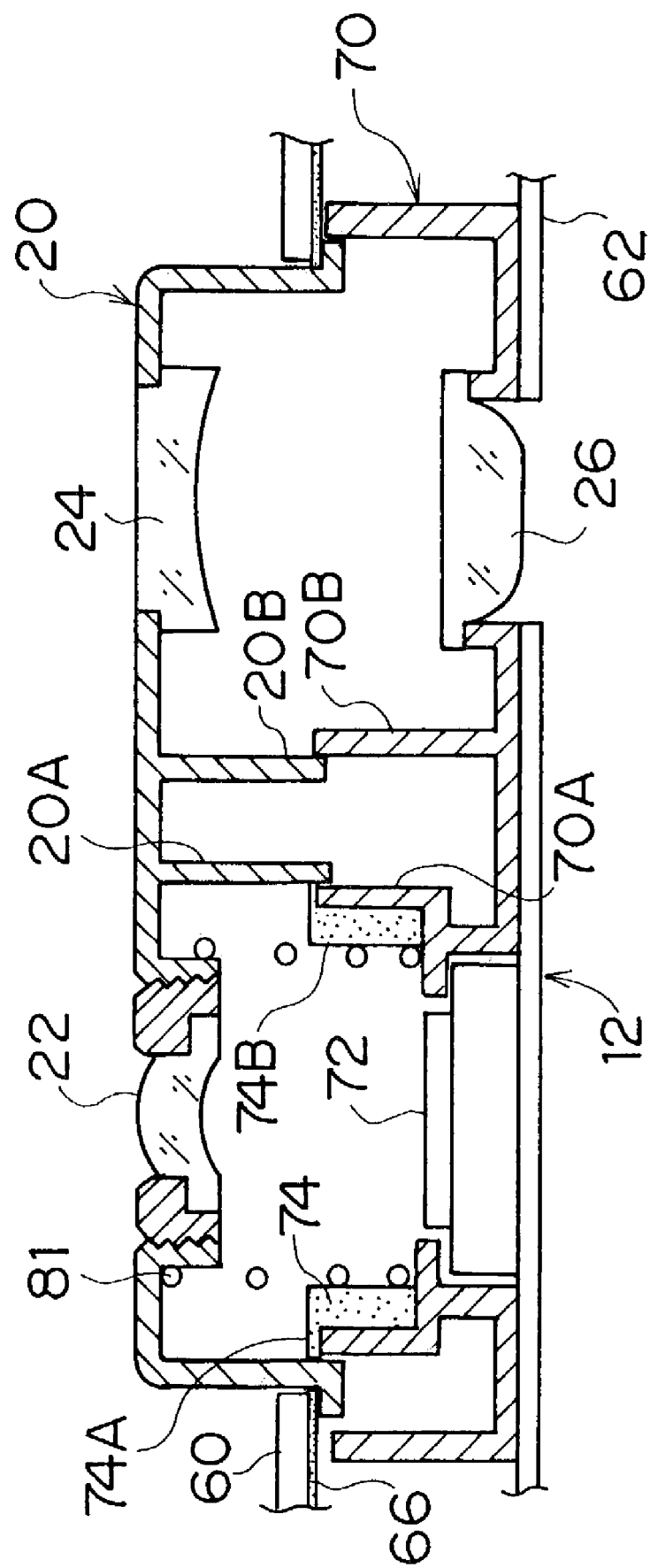
FIG. 14 is a vertical sectional view of the lens unit and the camera body with the lens unit popped up.

FIG. 13 is a perspective view, partly in section, of the lens unit 20 and the camera body 12 with the lens unit 20 housed in the camera body 12, and FIG. 14 is a vertical sectional view of the lens unit 20 and the camera body 12 with the lens unit 20 popped up.

As shown in FIG. 14, the light shielding wall 70A that surrounds the front periphery of the CMOS image sensor 72, and the light shielding wall 70B that divides the CMOS image sensor 72 from the eyepiece 26 are formed on the main frame 70 of the camera body. In the lens unit 20, the light shielding walls 20A, 20B are formed between the taking lens 22 and the objective lens 24 of the optical finder.

As shown in FIG. 14, the light shielding wall 20A and the light shielding wall 70A slightly overlap each other, and the light shielding wall 20B and the light shielding wall 70B slightly overlap each other, with the lens unit 20 popped up. Thus, lights from the objective lens 24 and the eyepiece 26 of the optical finder are blocked by the light shielding walls 20A, 70A, and the light shielding walls 20B, 70B so as not to enter the CMOS image sensor 72.

The light shielding walls 20A, 20B of the lens unit 20, and the light shielding walls 70A, 70B of the camera body slightly overlap each other to prevent each light shielding wall from hindering housing of the lens unit 20 when a projecting amount of the lens unit 20 is maximum with respect to the thickness of the camera body. End surfaces of the light shielding walls 20A, 20B of the lens unit 20, and end surfaces of the light shielding walls 70A, 70B of the camera body may be flush with each other.

Next, effects of the light shielding rubber 64 (see FIG. 6) attached inside the front cover 60 and the inner rubber 74 loaded into the light shielding wall 70A of the CMOS image sensor 72 will be described.

As shown in FIG. 6, the opening 64A of the light shielding rubber 64 is slightly smaller than the opening 60A of the front cover 60 for the lens unit to project, and always abuts against the outer peripheral surface of the lens unit 20 with elasticity as shown in FIGS. 13 and 14. The light shielding rubber 64 can provide light shielding between the lens unit 20 and the opening 60A of the front cover 60 to prevent the light from entering the camera body. The light shielding rubber 64 is dustproof to protect the camera body from dust.

On the other hand, the inner rubber 74 loaded into the light shielding wall 70A surrounding the CMOS image sensor 72 has the flange 74A at the top thereof, and the opening 74B opposing the CMOS image sensor 72 at the middle thereof.

The flange 74A is slightly larger than the outer periphery of the light shielding wall 70A, and always abuts against the inner peripheral surface of the lens unit 20 with elasticity as shown in FIGS. 13 and 14. The inner rubber 74 prevents the light that enters the camera body from entering the CMOS image sensor 72.

In this embodiment, the light shielding walls 20A, 20B, 70A, 70B, the light shielding rubber 64, and the inner rubber 74 are combined to prevent the unnecessary light from entering the CMOS image sensor 72, but not limited to this, each component may be independently used for light shielding measures. Instead of the light shielding rubber 64 and the inner rubber 74, light shielding members other than rubber may be used as long as the members do not prevent popping up of the lens unit 20. Further, in order to minimize light transmittance, the plastic members of the lens unit 20 and the main frame 70 are preferably made of dark-colored (e.g., dark blue, dark green, dark red, black, etc.) plastic material, and/or the plastic members may be metal plated.

As described above, according to the invention, there is provided the digital camera in which the lens unit having the taking lens and the objective lens of the optical finder is popped up from the camera body, wherein the lens unit and the camera body each have the light shielding walls to prevent the light from the optical finder from entering the image pickup devise. The camera body has the light shielding member that abuts against the outer or the inner surface of the popped up lens unit to prevent the light from the periphery of the lens unit from entering the camera body, and prevent the light that enters the camera body from entering the image pickup device placed in the lens unit.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera, comprising:
a camera body which has an image pickup device and an eyepiece of an optical finder, wherein the image pickup device and the eyepiece are adjacent;
a lens unit which holds a taking lens and an objective lens of the optical finder, wherein the taking lens and the objective lens are adjacent; and
a popping up mechanism which projects and retracts the lens unit from and in the camera body, wherein:
the camera body has a first light shielding wall which divides the image pickup device from the eyepiece;
the lens unit has a second light shielding wall which divides the taking lens from the optical finder; and
when the lens unit is popped up, the first light shielding wall and the second light shielding wall slightly overlap each other, or an end surface of the first light shielding wall and an end surface of the second light shielding wall are flush with each other, thereby preventing a light that enters the optical finder from entering the image pickup device,
wherein the first light shielding wall comprises a surrounding wall that surrounds the image pickup device and an additional wall disposed between the eyepiece and the surrounding wall,
wherein the second light shielding wall comprises a pair of walls disposed between the taking lens and the optical finder, so that the pair of walls are placed between the surrounding wall and the additional wall.

2. The digital camera as defined in claim 1, wherein:
an exterior body of the digital camera comprises a front cover and a rear cover made of metal;
the camera body is provided between the front cover and the rear cover, and has a main frame which holds the image pickup device and the eyepiece;
the main frame is made of dark-colored plastic material; and
the first light shielding wall is formed integrally with the main frame.

3. The digital camera as defined in claim 2, wherein:
the lens unit has a lens holding frame which holds the taking lens and the objective lens;
the lens holding frame is made of dark-colored plastic material; and
the second light shielding wall is formed integrally with the lens holding frame.

4. The digital camera as defined in claim 1, wherein:
the lens unit has a lens holding frame which holds the taking lens and the objective lens;
the lens holding frame is made of dark-colored plastic material; and
the second light shielding wall is formed integrally with the lens holding frame.

5. A digital camera, comprising:
a camera body which has an image pickup device;
a lens unit which holds a taking lens; and
a popping up mechanism which projects and retracts the lens unit from and in the camera body,
wherein the camera body has a light shielding member which has an opening opposing the image pickup device and abuts against an inner peripheral surface of the lens unit,
wherein the light shielding member includes a rubber member having an opening opposing the image pickup device, the rubber member having an outside dimension larger than the inner peripheral surface of the lens unit.

6. A digital camera, comprising:
a camera body which has an image pickup device;
a lens unit which holds a taking lens; and
a popping up mechanism which projects and retracts the lens unit from and in the camera body,
wherein the camera body has a light shielding member which has a first opening for the lens unit to project and abuts against an outer peripheral surface of the lens unit,
an exterior body of the digital camera comprises a front cover and a rear cover made of metal;
the front cover has a second opening for the lens unit to project;
the light shielding member is a rubber member attached to an inside of the front cover; and
the first opening of the rubber member is smaller than the second opening.

* * * * *